Figure 1:
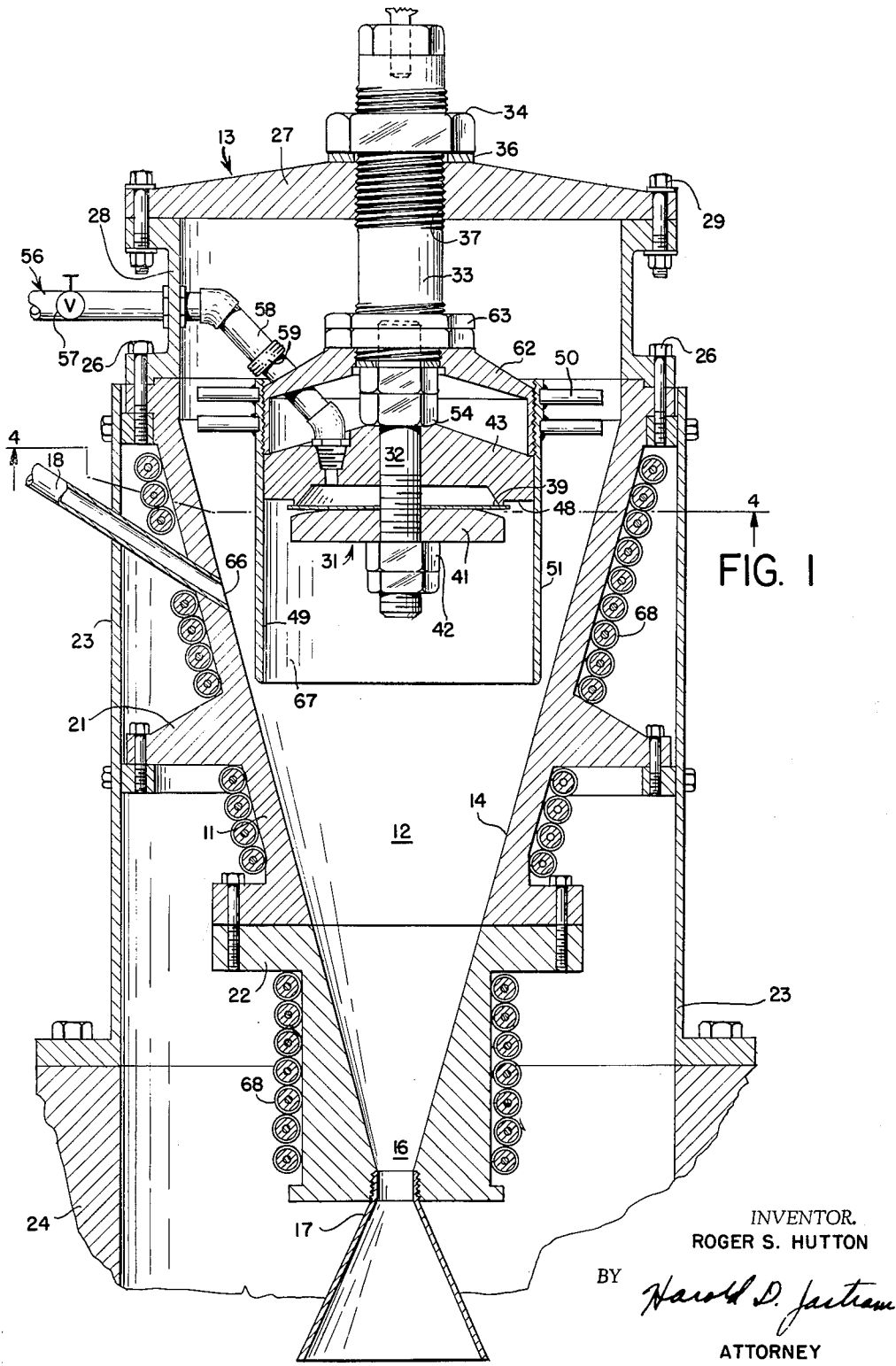

INVENTOR.
ROGER S. HUTTON
BY Harold D. Jastram
ATTORNEY

Oct. 19, 1965   R. S. HUTTON   3,212,756
SOUND GENERATOR

Filed Jan. 15, 1963   3 Sheets-Sheet 3

INVENTOR.
ROGER S. HUTTON
BY *Harold D. Jastram*
ATTORNEY

United States Patent Office 3,212,756
Patented Oct. 19, 1965

3,212,756
SOUND GENERATOR
Roger S. Hutton, Sacramento, Calif., assignor to
General Mills, Inc., a corporation of Delaware
Filed Jan. 15, 1963, Ser. No. 251,676
14 Claims. (Cl. 259—1)

This invention relates to an apparatus for generating compression waves, and more particularly to an apparatus for treating material such as food products and particulate materials with compression waves.

Sound waves at various frequencies have been employed for many purposes including homogenizing and emulsifying of liquids, the determination of flaws in castings or other solids, the sterilization of food products, drying of various materials including food products and for experimental uses in connection therewith. The results produced however, have been limited due to the functional limitations of the apparatus employed.

Sound waves or compression waves can be utilized to dry a product without the need of applying elevated temperatures to the product. The compression waves or sound waves are applied to particulate material to agitate the material and effectuate drying of the material in the presence of the compression waves or sound waves. The compression waves produce an agitation of the material and a strong turbulence in the motion of gas molecules near the material which is being dried. Consequently, an apparatus is needed which can produce compression waves or sound waves which are of sufficient high intensity to accomplish effective drying of the material.

Another application of compression or sound waves has been in the sterilization of food products. It is known that various micro organisms will be destroyed if they are subjected to particular frequencies of compression waves or sound waves. The compression waves consequently provide an effective means of destroying micro organisms without the need for adding additional chemicals or other products which may contaminate or alter the taste of a food product. It is known however, that certain micro organisms are destroyed only by selected frequencies. Thus, an apparatus which can be effectively used to destroy micro organisms in products such as food products, must be adapted to change frequency to effectively destroy a wide variety of micro organisms which may occur in the food.

Acoustic devices have also been used, as noted above, for inspection of castings and other products and for various experimental work. Applications such as these require an apparatus which is capable of generating acoustic fields of varying frequencies and varying energy levels. The phrases "Compression waves" or "sound waves" are being used herein to mean any series of alternately positive and negative pressure regions travelling through a medium. The term includes audible as well as utrasonic frequencies, and a device useful for generating and utilizing compression waves may for convenience sake be referred to as "an acoustic device," although such apparatus is by no means limited to use with waves of audible frequency.

An object of the present invention is to provide a new and improved apparatus for generating compression waves.

Another object of the present invention is to provide a new and improved apparatus for generating compression waves to treat material introduced into an acoustic field.

A further object of the present invention is to provide a new and improved acoustic device for generating compression waves which is capable of varying the frequency of the compression waves and varying the intensity of the compression waves for the purpose of treating materials such as food products to dry, sterilize, and otherwise process the product.

Another object of the present invention is to provide a new and improved acoustic device for efficiently generating compression waves in a gaseous medium contained in a chamber having a predetermined shape and volume.

A still further object of the present invention is to provide an acoustic device having a treating chamber provided internally with a generator for generating compression waves in a gaseous medium together with a device for varying the frequency and the intensity of the compression waves to treat materials in the presence of the acoustic field at elevated temperatures which are attained by the use of a heating device associated with the treating chamber.

A further object of the present invention is to provide an acoustic device for treating materials in an acoustic field wherein a treating chamber is utilized which is capable of focusing compression waves which are generated and intensified within the treating chamber.

With these and other objects in view, the present invention contemplates a conical chamber for focusing compression waves which are generated by a sound generator which is positioned within the base end of the conical chamber. A resonator surrounds the sound generated to intensify the generated sound waves and to direct the compression waves along the length of the conical chamber. The resonator also acts as a means for metering the material which is introduced into the treating chamber. A gaseous material is introduced into the sound generator to operate a vibrator plate which generates the compression waves or sound waves. The gaseous material is introduced into the sound generator in a controlled fashion to regulate the amplitude of the generated compression waves or sound waves. The conical treating chamber directs or focuses the generated compression or sound waves to a nozzle at the apex end of the chamber where the product and gaseous material are discharged.

Figure 2:
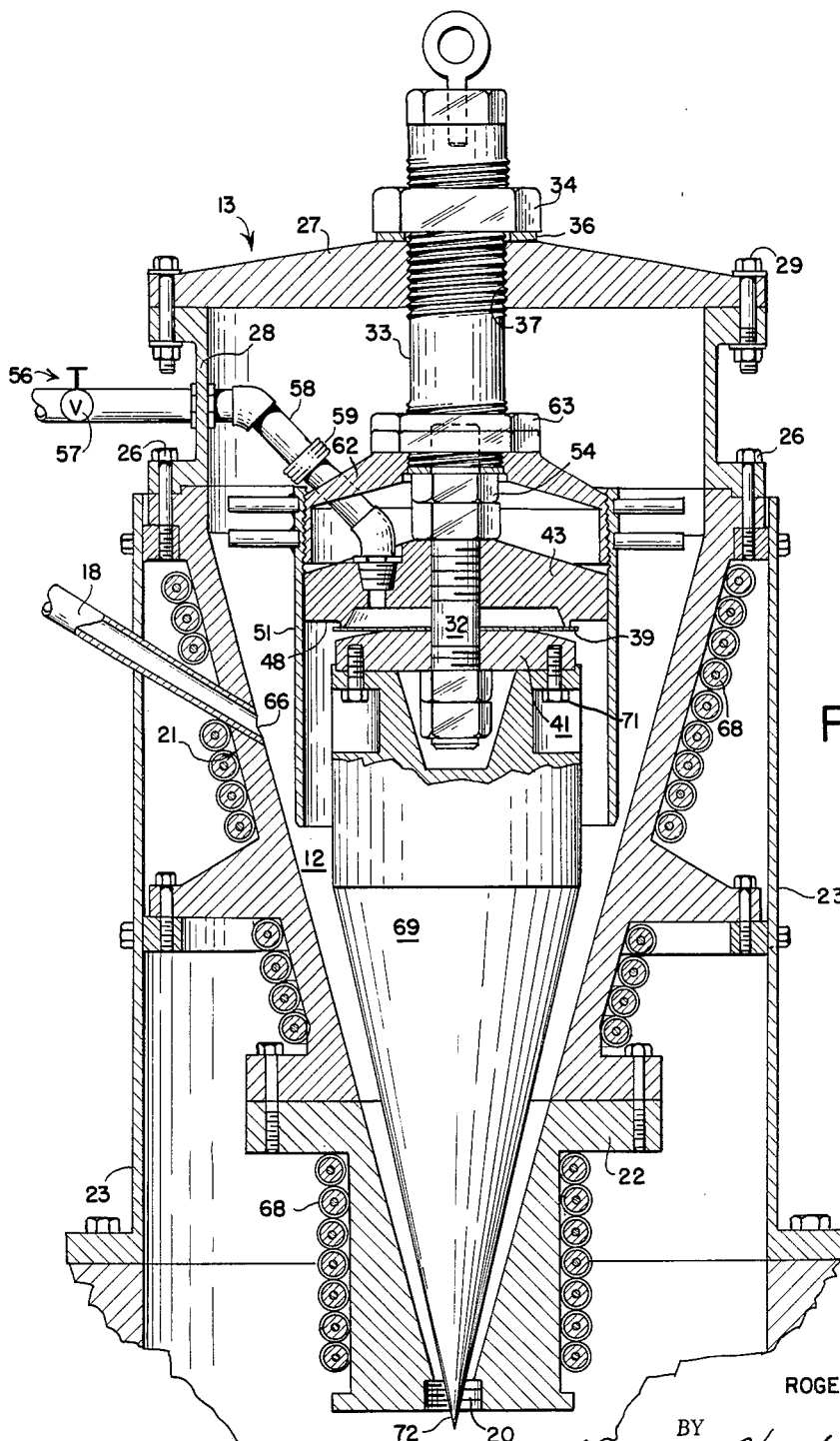
Figure 3:
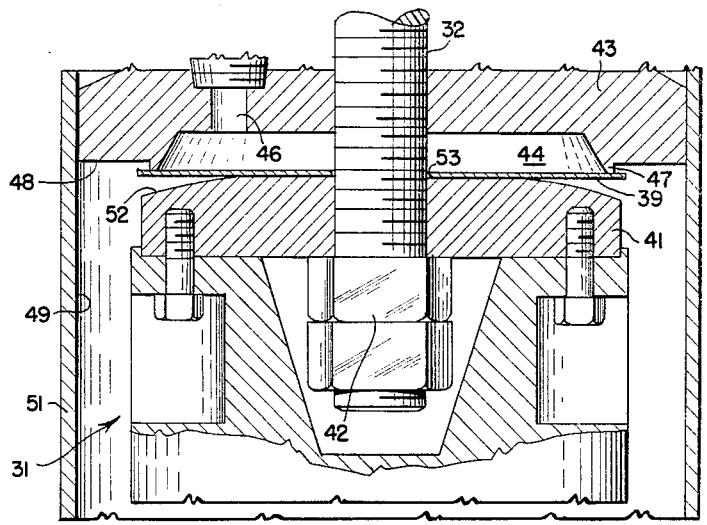
Figure 4:
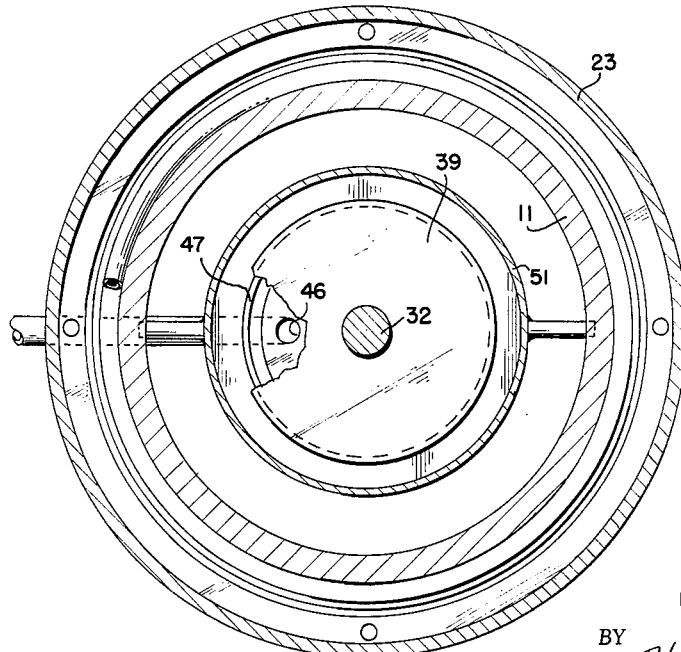

These and other objects and features of the invention will be more readily understood and appreciated from the following detailed description of a preferred embodiment thereof selected for purposes of illustration and shown in the accompanying drawings, in which:

FIGURE 1 is a cross section of an acoustic device according to the present invention showing a conical treating chamber, a resonator, and associated apparatus, FIGURE 2 is an alternate embodiment of the device shown in FIGURE 1 and is in cross section showing a conical member within the treating chamber for regulating the volume of the treating chamber, FIGURE 3 is a fractional cross section view of a sound generator and resonator shown in FIGURES 1 and 2, and FIGURE 4 is a cross sectional view taken along lines 4—4 of FIGURE 1 showing the configuration of the treating chamber and other components.

Refer now to FIGURE 1 of the drawing where there is shown a cross section of an acoutsic device. Wall 11 encloses a conical treating chamber 12 of the acoustic device generally designated by the numeral 13. The inside surface 14 of the wall 11 is smooth to permit the conduction of sound or compression waves without obstruction or attenuation toward the apex 16 of the chamber 12 where a nozzle 17 is located. The wall 11 may be constructed from any material such as steel, aluminum or similar material which is rigid enough to withstand high intensity sound waves which are generated in the unit. The inside surface 14 of the treating chamber 12 should be smooth so that very little attenuation of sound waves takes place as sound waves or compression waves travel along or are reflected from the surface 14 on the way to the apex 16. Surface 14 also must be smooth so that no material such as food products, water droplets, or other material which is introduced through a material inlet 18, will be collected by the surface 14.

The chamber 12 is in the form of a cone so that compression waves which are generated within the chamber are focused as they travel from the base of the chamber to the apex 16 and nozzle 17 of the chamber. Focusing of the generated compression waves or sound waves permits intensification of the generated sound. The chamber 12 is tapered so that the sound waves are directed or focused to a point at the nozzle 17 of the chamber. The sound waves which are generated then exit at the nozzle 17 together with any material which may have been processed in the chamber 12 by the compression waves.

The chamber 12 may be constructed from several units such as a base portion 21 and the apex portion 22 in the case of a very large and heavy generator. This permits fabrication of the device with a reduction of transportation and handling problems, however it should be noted that construction of a chamber 12 from a single piece of material is equally feasible and may be desirable. The chamber 12 is bolted, for support purposes, to a chassis 23 which in turn is connected to a base 24. The chamber 12 is bolted by bolt 26 to the chassis 23.

The base portion 21 of the chamber 12 is enclosed by a cap 27 which is connected to the base portion 21 by a connecting ring 28. The cap 27, the connecting ring 28, and the base portion 21 of the chamber 12 are interconnected by bolts 26 and 29. Other methods of construction may be utilized with equal success to form the base portion of the chamber 12. Examples of such construction might include thread and screw connections, rivets, and the like. Compression waves or sound waves are generated by a sound generator unit generally designated by the number 31. The unit 31 is mounted on a shaft 32 which screws into a hollow mounting shaft 33. Shaft 33 extends through the cap 27 and is secured in place by a lock nut 34 and a lock washer 36. The lock nut 34 secures the shaft 33 when it is tightened against the cap 27. The shaft 33 is threaded so that it screws into threads 37 of the cap 27. This feature permits the entire sound generating unit 31 and an adjustable resonator 51 to be adjusted vertically within the treating chamber 12.

Members 50 projecting horizontally from the top of resonator 51 are used for rotating the resonator 51.

Refer now to FIGURE 3 of the drawings where the sound generating unit 31 is shown in greater detail. A washer shaped vibrator plate 39 is placed on the shaft 32 and rests upon a plate support 41. Plate support 41 may be threaded onto the shaft 32 or it may simply be retained on the shaft 32 by the lock nuts 42. The plate 39 is mounted in contact with plate support 41. The plate 39 is a flexible plate which is utilized to generate the compression waves or sound waves in conjunction with an annular nozzle 43.

The annular nozzle 43 is threaded onto the shaft 32 so that it may be permanently positioned in a particular location on the shaft 32. The nozzle 43 also has a fluid chamber 44 which is utilized to trap a fluid such as gas, hot air, steam or the like which enters the chamber 44 through an opening 46. The pressure of the fluid entering the chamber 44 builds up until it flexes the plate 39 downwardly as viewed in FIGURE 3 against the plate support 41. The compressed fluid is thus released and represents a compressed portion or positive portion of a compression or sound wave. After the fluid has been released, the plate 39 returns to the position shown in FIGURE 3 where the plate 39 rests on projection 47 of the nozzle 43. The flat portion 48 of the nozzle 43 acts as a reflector for the compression waves so that the compression wave is reflected vertically downward along the inside surface 49 of a resonator 51.

The top surface 52 of the support plate 41 is a curved surface designed to support the plate 39 and permit it to flex to generate the variations in compressed fluid necessary to generate compression waves. The surface 52 is also curved in order to permit a variation in the frequency of the generated compression waves. Plate 39 may be a curved washer which has generally the same shape as the surface 52 but which is curved to a lesser degree.

To vary the frequency of the generated compression waves, the nozzle 43 is moved downward relative to the support plate 41 thus progressively forcing more of the vibrator plate 39 in contact with the curved surface 52 of the support plate 41. If very little pressure is exerted on the vibrator plate 39, by the projection 47 of the nozzle 43, the support plate 41 will contact the plate 39 only near the inner opening 53 of the plate 39. If however, the nozzle 43 is moved downward relative to the support plate 41 and the vibrator plate 39, a greater portion of the central part of the plate 39 is progressively forced into contact with surface 52. This movement of plate 39 changes the flexing characteristics of the vibrator plate 39 and changes the frequency at which the plate 39 vibrates as a result of compressed fluid escaping from the chamber 44 between projection 47 and plate 39.

The nozzle 43 is moved downward by moving the nozzle vertically downward and securing it by nut 54 (see FIGURE 1 of the drawings). Another way of changing the contact between the plate 39 and the surface 52 is to move the support plate 41 vertically upward forcing the plate 39 against the nozzle 43. The plate 41 is simply threaded along the shaft 32 a greater distance to force the plate 39 into contact with the nozzle 43 and the lock nuts 42 are threaded to secure the plate 41 in the new position. Thus it can be seen that with careful adjustment of the relative position of the plate support 41, the plate 39 and the nozzle 43, the frequency of the compression waves or sound waves which are generated may be easily and precisely controlled.

A fluid such as steam, air, or the like is introduced into the chamber 44 from a fluid supply system generally designated by the number 56. The fluid is regulated by a valve 57 which controls the pressure in the line 58. By varying the pressure in the line 58, a variation in the amplitude of the generated sound waves can be accomplished. An increase in the pressure in the line 58 results in an increase in the pressure in the chamber 44 and a consequent increase in the amplitude of the compression waves generated by the sound generating unit 31. Conversely, a reduction in the pressure in line 58 results in a reduction in the amplitude of the compression waves. The line 58 may have a coupling 59 which will adapt itself to movement of the nozzle 43 and other vertical movements so that adjustments can be made in the acoustic device to adapt the device to a particular job.

The sound waves or compression waves generated by the sound generating unit 31 are reflected by the nozzle 43 and focused by the inner surface 49 of the resonator 51. The resonator 51 directs the compression waves toward the apex end of the chamber 12 and additionally intensifies or amplifies the compression wave. The resonator 51 is attached to a bell union 62 which in turn is threaded to the shaft 33. Lock nuts 63 secure the resonator unit 51 to the shaft 33 so that a precise control of the position of the resonator unit 51 may be maintained. The nozzle 43 securely contacts the inner surface 49 of the resonator 51. This contact between the nozzle 43 and the resonator 51 determines the resonant frequency of the resonator cylinder which extends below the nozzle 43. By adjusting the position of the bell union 62 on shaft 33, the resonant frequency of the resonator 51 may be changed in accordance with a change in the output frequency of the sound generating unit 31. The lock nuts 63 are simply loosened and the bell union which carries the resonator 51 is moved along the axis of the shaft 33 in a direction necessary to bring the resonator 51 into resonance with the output frequency of the sound generating unit 31. Thus it can be seen that the resonator 51 not only directs the compression waves to the apex of the chamber 12, but it also intensifies or amplifies the generated compression wave.

When material is introduced into the chamber 12 for treatment by the compression waves, the resonator 51 serves an additional function. As previously noted the entire resonator 51 and generating unit 31 may be moved vertically within the base portion of the chamber 12. This vertical movement of the entire resonator 51 permits the use of the resonator unit as a valve to control the amount of material which is permitted to flow into the portion of the treating chamber 12 between the resonator 51 and the apex 16. Refer now to FIGURE 1 of the drawings. The material is introduced into the chamber 12 through an input 18 which is situated in the wall of the chamber 12 near the base end thereof. The opening 66 is situated above the open end 67 of the resonator 51 so that it is between the interior wall 14 of the chamber 12 and the resonator 51. Material which enters the chamber 12 through opening 66 must pass between the interior surface 14 and the resonator 51. Since the resonator 51 may be moved relative to the interior surface 14 of the chamber 12, the distance between the resonator 51 and the surface 14 may be varied to control the amount of material permitted to flow toward the apex 16 of the chamber.

Very often material which is to be treated in the chamber must be subjected to elevated temperatures or predetermined temperatures depending upon the material and the type of processing which is being carried out on the material. To accomplish this precise temperature control within the chamber 12, a series of coils 68 are shown in contact with the outer wall of the chamber 12 which regulate the temperature of the air in the chamber 12. These coils 68 may be heating coils or they may be cooling coils which function to maintain a precise temperature within the treating chamber 12. As an example, if the material which enters the treating chamber 12 is to be dehydrated, the coil 68 may be utilized as heat coils for maintaining the interior temperature of the treating chamber 12 at an elevated temperature necessary to completely dry the product as it is being agitated by the compression waves.

Refer now to FIGURE 2 of the drawings where there is shown an alternate embodiment of the acoustic device which utilizes an interior cone member 69. This interior cone member 69 is bolted to the plate support 41 by bolts 71. The cone 69 extends through the open end 67 of the resonator 51 and extends along the interior surface 14 of the chamber 12. The cone terminates in an apex 72 which extends through the nozzle 20 in the chamber 12. This interior cone 69 permits an intensification of the compression wave density which waves are travelling along or are reflected from the surface 14 of the treating chamber 12. The cone 69 is shaped so that the boundaries making up the chamber 12 converge as the chamber approaches the apex. The convergence of the chamber 12 results in an increased sound density of the wave travelling in the chamber 12. The cone furnishes another surface for sound wave reflection or focusing purposes. This cone 69 works very well in the chamber 12 since the generator 31 produces a dough-nut shaped sound wave which may be efficiently intensified by such a cone 69.

Since the cone 69 is connected directly to the plate support 41, the space between the outer surface of the cone 69 and the surface 14 of chamber 12 may be varied by merely positioning the entire unit including the sound generating unit 31 and the resonator 51 by moving the shaft 33 axially within the end cap 27. The cone 69 also permits a confinement of the material which is being treated near the wall or interior surface 14 of the chamber 12. A divergent nozzle may be provided at the apex 16 for controlling the expansion of the fluid leaving the nozzle 17. This type of nozzle may or may not be a desirable feature depending upon a particular application of the acoustic device.

It is to be understood that the above described arrangements are simply illustrative of the application of the principles of the invention. Numerous other arrangements may be readily devised by those skilled in the art which will embody the principles of the invention and fall within the spirit and scope thereof.

Now therefore, I claim:

1. An acoustic device which comprises a conical chamber for focusing sound waves and having an opening at the apex, means mounted within said chamber for amplifying sound waves, and means mounted within said amplifying means for generating sound waves.

2. An acoustic device which comprises a conical sound focusing chamber having an opening at the apex, a cylindrical resonator mounted within the chamber and having an open end adjacent the apex of said chamber, and means mounted within said resonator for generating sound waves which are amplified and focused by said resonator and said chamber.

3. An acoustic device in accordance with claim 2 in which the means for generating includes an annular nozzle having a chamber open at one side for trapping fluid, a flexible vibrator plate which engages said nozzle on the open side of said chamber to close the chamber, and a vibrator plate support.

4. An acoustic device in accordance with claim 3 in which said means for generating further includes a valve for regulating the amplitude of generated sound waves and means for adjusting the relative positions of said annular nozzle, plate, and support to vary the frequency of generated sound waves.

5. An acoustic device in accordance with claim 4 in which said means for adjusting includes a shaft for aligning said annular nozzle, plate and support on a common axis and in which the surface of said support which contacts said plate is a curved surface which determines the frequency of oscillation of said plate.

6. An acoustic device which comprises a conical chamber for focusing sound waves and having a nozzle at the apex, means mounted within said chamber for amplifying sound waves, means mounted within said amplifying means for generating sound waves, and a conical member connected by the base to said means for generating and extending into said conical chamber and with the apex of said conical member associated with said nozzle.

7. An acoustic material treating device which comprises a conical treating chamber for focusing sound waves and having a nozzle at the apex, resonator means mounted within the treating chamber for amplifying sound waves, generator means mounted within said resonator means for generating sound waves of predetermined frequency and amplitude, and means for introducing material into said treating chamber for sound treatment to agitate said material.

8. A device in accordance with claim 7 which further includes means for adjusting the relative position of said generator means within said resonator and in which said generator means includes a fluid valve for controlling the amplitude of generated sound waves.

9. An acoustic material treating device in accordance with claim 7 in which said means for introducing material is positioned to introduce material into said treating chamber between the treating chamber wall and said resonator means and which further includes means for adjusting the relative position of said resonator means within said treating chamber to regulate the flow of material through said treating chamber.

10. A device in accordance with claim 9 which further includes means contacting the wall of said conical treating chamber for maintaining the air in said treating chamber at a predetermined temperature.

11. An acoustic material treating device which comprises a conical treating chamber having a nozzle at the apex, a cylindrical resonator having an open end positioned in said chamber with the open end adjacent said nozzle, sound generating means mounted within said resonator, a conical member connected to said generating means and extending into said treating chamber through the open end of said resonator and with the apex of said member associated with said nozzle, and means for introducing material into said treating chamber for treatment with sound waves.

12. An acoustic material treating device in accordance with claim 11 which further includes means for adjusting the relative position of said conical member with respect to said treating chamber walls to vary the volume of said chamber.

13. An acoustic material treating device in accordance with claim 12 which further includes heating coils contacting the outer wall of said treating chamber to elevate the temperature of the air in said treating chamber.

14. An acoustic material treating device in accordance with claim 13 wherein said sound generating means and said resonator are positioned at the base end of said conical treating chamber and which further includes enclosing means connected to the base end of said conical treating chamber for enclosing said sound generating means and said resonator.

References Cited by the Examiner

UNITED STATES PATENTS

| | | | |
|---|---|---|---|
| 2,138,052 | 11/38 | Williams | 259—1 |
| 2,364,987 | 12/44 | Lee. | |
| 2,632,634 | 3/53 | Williams. | |
| 2,693,944 | 11/54 | Fowle | 259—1 |

WALTER A. SCHEEL, *Primary Examiner.*